(12) United States Patent
Athiwaratkun et al.

(10) Patent No.: US 12,693,835 B1
(45) Date of Patent: Jul. 28, 2026

(54) CONTEXT-AWARE BIFURCATED ATTENTION FOR EFFICIENT SAMPLING

(71) Applicant: Amazon Technologies, Inc., Seattle, WA (US)

(72) Inventors: Praphruetpong Athiwaratkun, Jersey City, NJ (US); Jiacheng Guo, Kirkland, WA (US); Yuchen Tian, Santa Clara, CA (US); Haifeng Qian, Mount Kisco, NY (US); Vamshidhar Krishnamurthy Dantu, Sunnyvale, CA (US); Matthew Lee, Elmhurst, NY (US); Ramesh M. Nallapati, San Jose, CA (US); Parminder Bhatia, Kearny, NJ (US); Srinivas Iragavarapu, Redmond, WA (US); Rama Krishna Sandeep Pokkunuri, Redmond, WA (US); Sudipta Sengupta, Bellevue, WA (US); Bing Xiang, Mount Kisco, NY (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 18/194,330

(22) Filed: Mar. 31, 2023

(51) Int. Cl.
    *G06F 8/33* (2018.01)
    *G06F 40/40* (2020.01)

(52) U.S. Cl.
    CPC ............... *G06F 8/33* (2013.01); *G06F 40/40* (2020.01)

(58) Field of Classification Search
    CPC .................................. G06F 8/33; G06F 40/40
    See application file for complete search history.

(56) References Cited

U.S. PATENT DOCUMENTS

| | | | | |
|---|---|---|---|---|
| 12,175,220 | B2 * | 12/2024 | Sundaresan ............. | G06F 8/427 |
| 2020/0342316 | A1 * | 10/2020 | Shazeer ................. | G06N 3/045 |
| 2022/0108035 | A1 * | 4/2022 | Mehta .................... | G06N 20/00 |
| 2022/0214863 | A1 * | 7/2022 | Clement .................. | G06F 8/33 |
| 2022/0398071 | A1 * | 12/2022 | Allamanis .............. | G06N 3/084 |
| 2023/0112921 | A1 * | 4/2023 | Cai ........................... | G06F 8/31 |
| | | | | 717/104 |
| 2023/0280985 | A1 * | 9/2023 | Hayashi ................. | G06N 3/045 |
| 2023/0359441 | A1 * | 11/2023 | Duan ..................... | G06N 3/084 |
| 2024/0104001 | A1 * | 3/2024 | Clement ............... | G06N 3/044 |

(Continued)

OTHER PUBLICATIONS

Noam Shazeer, "Fast Transformer Decoding: One Write-Head is All You Need," 2019 [retrieved on Mar. 10, 2025], pp. 1-9, downloaded from <url>:https://arxiv.org/abs/1911.02150. (Year: 2019).*

(Continued)

*Primary Examiner* — S. Sough
*Assistant Examiner* — Stephen D Berman
(74) *Attorney, Agent, or Firm* — Nicholson DeVos Webster & Elliott LLP

(57) ABSTRACT

Techniques for improved attention calculations are described. In some examples, the attention calculations are for a Transformer-based model. In some examples, a trained model is applied to input data, wherein the application of the trained model at least includes determining at least one of logits or an output of an attention-block using incremental decoding, wherein the incremental decoding calculation is decomposed into at least an incremental calculation and a context calculation.

20 Claims, 12 Drawing Sheets

900

RECEIVE REQUEST (E.G., TO GENERATE CODE) TO USE A TRAINED MODEL 902

GENERATE CODE USING THE TRAINED MODEL 904

PROVIDE INPUT DATA FROM THE REQUEST AS INPUT TO THE TRAINED MODEL 906

APPLY THE TRAINED MODEL, WHEREIN THE TRAINED ML MODEL AT LEAST INCLUDES DETERMINING AT LEAST ONE OF LOGITS OR AN OUTPUT OF AN ATTENTION-BLOCK USING INCREMENTAL DECODING, WHEREIN THE INCREMENTAL DECODING IS DECOMPOSED INTO AT LEAST AN INCREMENTAL CALCULATION AND A CONTEXT CALCULATION 908

OUTPUT A RESULT (E.G., GENERATED CODE) FROM THE TRAINED MODEL 910

(56)                References Cited

U.S. PATENT DOCUMENTS

2024/0134614 A1\*   4/2024   Bakshi ....................... G06F 8/65
2024/0248686 A1\*   7/2024   Garg ................... G06F 11/3668

OTHER PUBLICATIONS

Zhoujun Cheng et al., "Batch Prompting: Efficient Inference with Large Language Model APIs," 2023 [retrieved on Mar. 10, 2025], pp. 1-18 , downloaded from <url>:https://arxiv.org/abs/2301. 08721v1. (Year: 2023).\*

Yu Yan et al., "EL-Attention: Memory Efficient Lossless Attention for Generation," Jun. 11, 2021 [retrieved Oct. 11, 2025], Proceedings of the 38th International Conference on Machine Learning, PMLR 139, 2021, pp. 1-13, downloaded from <url>:https://arxiv. org/pdf/2105.04779. (Year: 2021).\*

Alexey Svyatkovskiy et al., "IntelliCode compose: code generation using transformer", Nov. 8, 2020 [retrieved Mar. 17, 2026], pp. 1433-1443, downloaded from <url>:https://dl.acm.org/doi/abs/10. 1145/3368089.3417058 (Year: 2020).\*

Irwan Bello et al., "Attention Augmented Convolutional Networks", 2019 [retrieved Mar. 17, 2026], pp. 3286-3296, downloaded from <url>: https://openaccess.thecvf.com/content_ICCV_2019/html/ Bello_Attention_Augmented_Convolutional_Networks_ICCV_ 2019_ paper.html. (Year: 2019).\*

Xuran Pan et al., "On the Integration of Self-Attention and Convolution", Mar. 14, 2022 [retrieved Mar. 17, 2026], pp. 1-16, downloaded from <url >:https://arxiv.org/abs/2111.14556. (Year: 2022).\*

Fahim Dalvi et al., "Incremental Decoding and Training Methods for Simultaneous Translation in Neural Machine Translation", Jun. 10, 2018 [retrieved Mar. 18, 2026], pp. 1-9, downloaded from <url>:https://arxiv.org/abs/1806.03661. (Year: 2018).\*

\* cited by examiner

QUERY (Q)
501

*

K FROM CONTEXT, DUPLICATED BROADCAST BY REFERENCE 503

NEW K FROM CURRENT STEP 507

K FROM PREVIOUS INCREMENTAL DECODING 505

LOGITS 509

```
if no_duplicate_broadcast and type(key) == dict:
    # n = 1 for incremental decoding
    # <bhnk, hm*k> -> bhnm*
    attn_weights_context = torch.einsum(
        "bhnk,hmk->bhnm", query, key["context_past_key"][0]
    )
    # <bhnk, bhm'k> -> bhnm'
    attn_weights_incremental = torch.einsum(
        "bhnk,bhmk->bhnm", query, key["incremental_past_key"]
    )
    attn_weights = torch.cat(
        [attn_weights_context, attn_weights_incremental], dim=-1
    )
elif not self.einsum:
    attn_weights = torch.matmul(query, key.transpose(-1, -2))
else:
    # MAIN
    attn_weights = torch.einsum("bhnk,bhmk->bhnm", query, local_window(key))
```

FIG. 7

800

```
# attn_output.size(): [b, h, n, v]
if no_duplicate_broadcast and type(value) == dict:
    # n = 1 for incremental decoding
    # <bhnm*, hm*v>
    context_past_value_length = value["context_past_value"].size(2)
    attn_output_context = torch.einsum(
        "bhnm,hmv->bhnv",
        attn_weights[:, :, :, :context_past_value_length],
        value["context_past_value"][0],
    )
    # <bhnm', bhm'k>
    attn_output_incremental = torch.einsum(
        "bhnm,bhmv->bhnv",
        attn_weights[:, :, :, context_past_value_length:],
        value["incremental_past_value"],
    )
    attn_output = attn_output_context + attn_output_incremental
elif not self.einsum:
    attn_output = torch.matmul(attn_weights, value)
else:
    attn_output = torch.einsum("bhnm,bhmv->bhnv", attn_weights,value)
```

*FIG. 8*

900

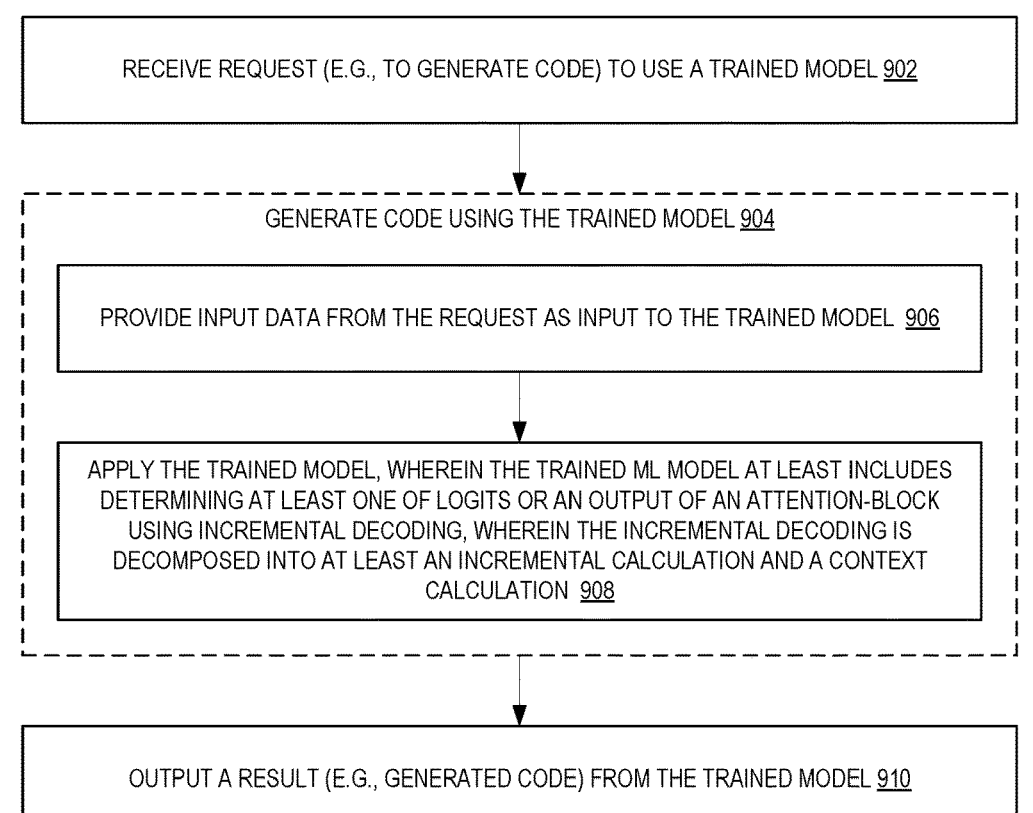

RECEIVE REQUEST (E.G., TO GENERATE CODE) TO USE A TRAINED MODEL 902

GENERATE CODE USING THE TRAINED MODEL 904

PROVIDE INPUT DATA FROM THE REQUEST AS INPUT TO THE TRAINED MODEL 906

APPLY THE TRAINED MODEL, WHEREIN THE TRAINED ML MODEL AT LEAST INCLUDES DETERMINING AT LEAST ONE OF LOGITS OR AN OUTPUT OF AN ATTENTION-BLOCK USING INCREMENTAL DECODING, WHEREIN THE INCREMENTAL DECODING IS DECOMPOSED INTO AT LEAST AN INCREMENTAL CALCULATION AND A CONTEXT CALCULATION 908

OUTPUT A RESULT (E.G., GENERATED CODE) FROM THE TRAINED MODEL 910

*FIG. 9*

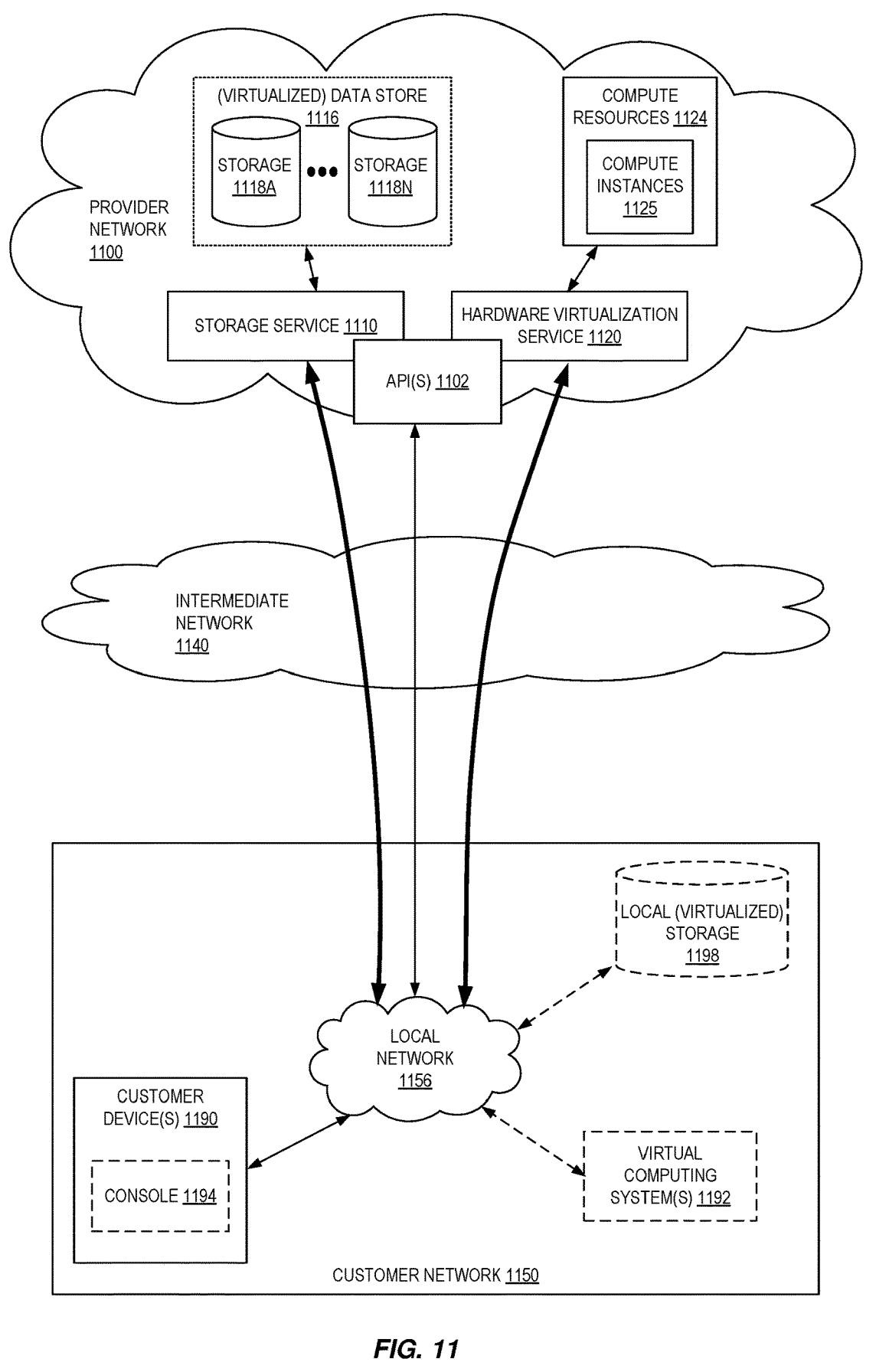

PROVIDER NETWORK 1100

(VIRTUALIZED) DATA STORE 1116

STORAGE 1118A  •••  STORAGE 1118N

COMPUTE RESOURCES 1124

COMPUTE INSTANCES 1125

STORAGE SERVICE 1110

API(S) 1102

HARDWARE VIRTUALIZATION SERVICE 1120

INTERMEDIATE NETWORK 1140

LOCAL (VIRTUALIZED) STORAGE 1198

LOCAL NETWORK 1156

CUSTOMER DEVICE(S) 1190

CONSOLE 1194

VIRTUAL COMPUTING SYSTEM(S) 1192

CUSTOMER NETWORK 1150

*FIG. 11*

CONTEXT-AWARE BIFURCATED ATTENTION FOR EFFICIENT SAMPLING

BACKGROUND

Generative language models have become ubiquitous and their deployment requires large compute resources and costs. Furthermore, the large inference latencies would hinder user experiences and make many applications intractable. The limiting factors in speeding up the models and reducing their deployment costs are the GPU/Accelerator memory limitations and I/O bandwidth limitation. For example, these limitations are problematic for generative large-language models that need to store all parameters of the model in the memory and repeatedly fetch them for generating each token.

BRIEF DESCRIPTION OF DRAWINGS

Various examples in accordance with the present disclosure will be described with reference to the drawings, in which:

FIG. 7 illustrates examples of code for a <Q,K> calculation.

FIG. 8 illustrates examples of code for a <weight, V> calculation.

FIG. 9 is a flow diagram illustrating operations of a method for using language model using at least GEMM and element-wise fusion according to some examples.

FIG. 11 is a block diagram of an example provider network that provides a storage service and a hardware virtualization service to customers according to some examples.

DETAILED DESCRIPTION

Figure 1:
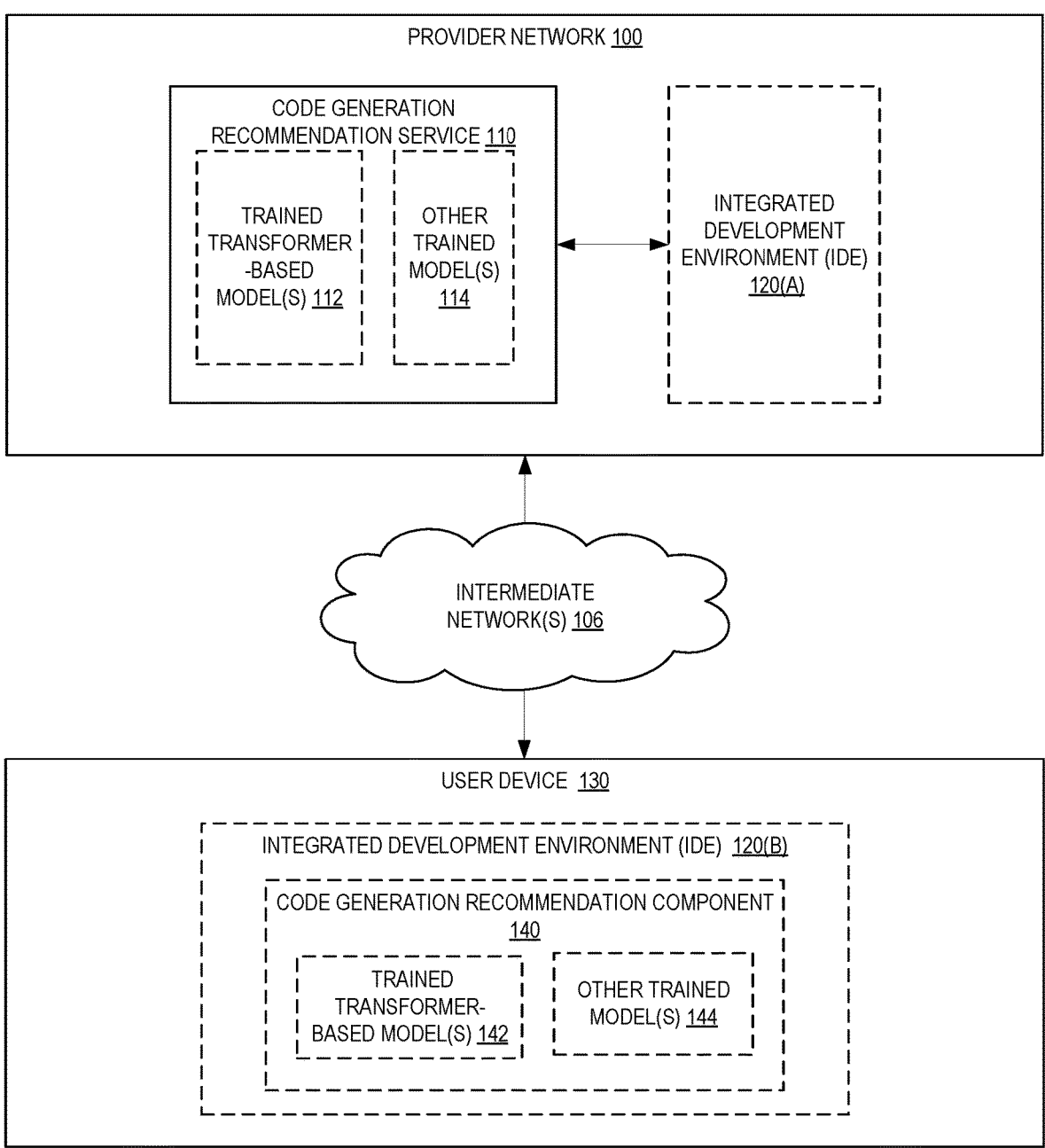
FIG. 1 illustrates examples of a code recommendation service as a part of a provider network's offerings.

The present disclosure relates to methods, apparatus, systems, and non-transitory computer-readable storage media for improved use of attention computation. Attention computation is the main bottleneck in terms of latency for token generation in Transformers models due to heavy memory access (input/output (I/O)) for memory. Examples disclosed herein optimize such I/O costs in the batch sampling scenario via techniques based on tensor decomposition to avoid duplicating memory I/O for context attentions. In some examples, by recognizing that the attention computations for an incremental decoding (tensor product between query q and key K, and between weight and value V) can be done in two parts, examples disclosed herein can split K into two parts for separate computation (K=prev_K_context+prev_K_incremental, where + is the concat operation). In short, examples broadcast to multiple indices within the sampling batch without duplicating the memory access (and hence, no-duplicate broadcasting) by decomposing the computation into two parts, so that the context part is aware that no duplication of I/O is needed.

Thus, in some examples the GPU memory used for inference is reduced significantly, allowing for the use of one GPU rather than two. The applicability extends across multiple model sizes. Without no-duplicative broadcasting, keeping the inference time low for sampling would be impossible due to high growth with respect to context length.

One area that attention-based models are used in in the generation of code. ML-powered code generation aims to assist developers in the writing of code in a more productive manner by intelligently generating code blocks based on natural language prompts. Some ML-powered code generation use large pretrained deep learning models to perform this task. Despite their great power, the huge number of model parameters of these models poses a significant threat to their adaptation in a regular software development environment, where a developer might use a standard laptop or mid-size server to develop code, as these large models incur significant resource usage (in terms of memory, latency, and cost) as well as having a large carbon footprint.

Recently, applying Transformer-based Pretrained Language Models (PLMs) to the source code generation task has drawn considerable attention. The goal is to generate complete or code fragments given natural language or partial code as prompts. To achieve this goal, large language models are trained on humongous code corpora, typically curated from open-source code archives like GitHub, Stack Overflow, etc.

In some examples, the PLMs typically use a decoder-only (e.g., GPT) or an encoder-decoder architecture (e.g., BART/ T5). For code generation tasks, decoder-only models take some pre-encoded code representation and learn to decode, i.e., synthesize next token sequences. Typically, these models use causal language modeling, i.e., generate the tokens conditioned on the previous token sequences. Thus, decoder-only models are a natural fit for code completion tasks where the previous code context is given and the model is expected to generate the next tokens. In contrast, encoder-decoder based code generation models are typically trained to learn to reconstruct the original code sequence that is corrupted using an arbitrary noise function. Therefore, such models do not naturally fit the code completion tasks but can be effective when fine-tuned for code generation or summarization tasks.

FIG. 1 illustrates examples of a code recommendation service as a part of a provider network's offerings. The code generation recommendation service 110 generates a computer code in response to a human written specification (commonly called a "prompt"). This service allows for the automation of aspects of the software development process and improves developers' productivity (and, in some examples, improves the security, reliability, etc. of the code). In some examples, the code generation recommendation service 110 uses one or more trained Transformer-based models 112 such as PLMs to generate code from a prompt. These Transformer-based models 112 utilize quantization techniques and/or fusion as detailed herein. In some examples, other trained model(s) 114 (that is, non-Transformer-based models) are used to generate code based on a prompt. Some of these other models 114 can utilize quantization techniques and/or fusion as detailed herein.

In some examples, the code generation recommendation service 110 runs on a graphical processing unit (GPU), a matrix accelerator (e.g., FPGA, matrix co-processor, etc.), a central processing unit (CPU), and/or a combination thereof.

The code generation recommendation service 110 typically couples to, or is a part of, an integrated development environment (IDE). In this illustration, there is an IDE service 120(A) provided by the provider network 100 and/or an external IDE service 120(B) that is installed on a user device 130. Either IDE 120(A) or 120(B) allows for a user using user device 130 to prompt either the code generation recommendation service 110 or a code generation component 140 (that utilizes trained Transformer-based model(s) 142 and/or other trained models 144 that utilize quantization techniques and/or fusion as detailed herein) to generate code from the prompt.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity-such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

Figure 2:
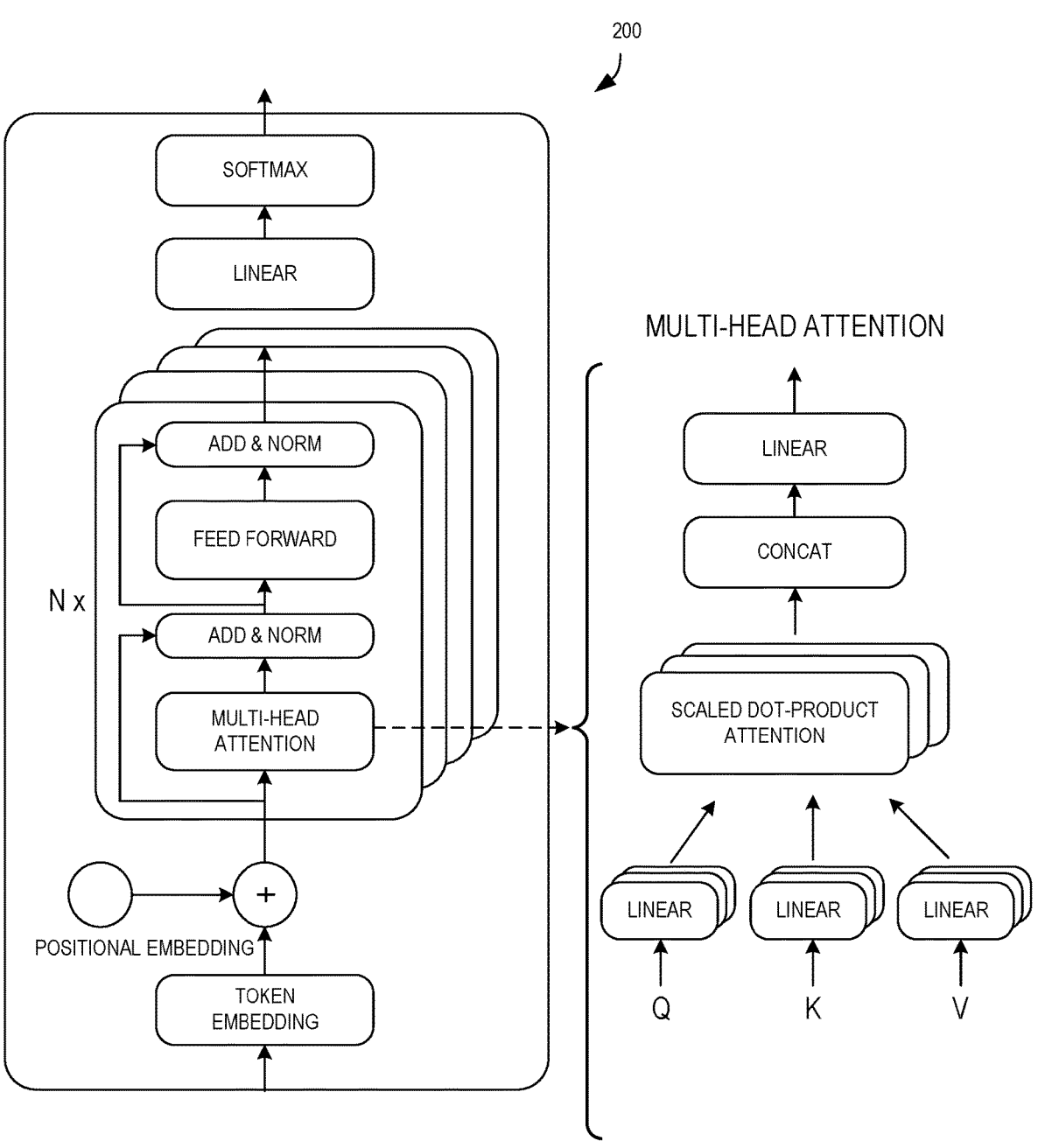
FIG. 2 illustrates examples of a Transformer model structure.

FIG. 2 illustrates examples of a Transformer model 200 structure. As shown, a Transformer model 200 utilizes a plurality of linear layers for the multi-head attention and the feed-forward layer also includes one or more linear layers (e.g., linear transformation, followed by ReLU, which is followed by another linear transformation). In some examples, one or more of the linear layers are quantized.

Figure 3:
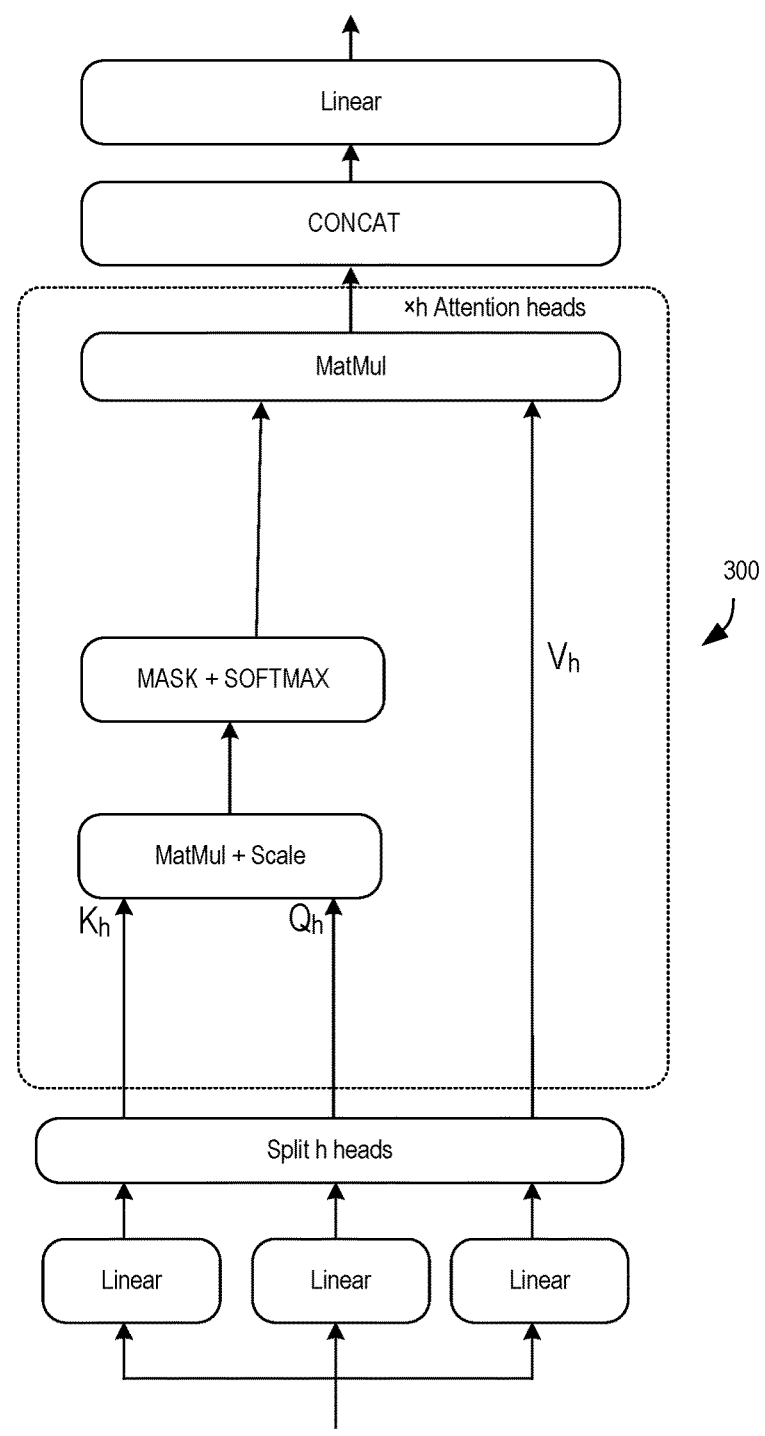
FIG. 3 illustrates examples of an attention block.

FIG. 3 illustrates examples of an attention block 300. As shown in FIG. 2, the input to the multiheaded attention block 300 comprises query (Q), key (K), and value (V) data that are subjected to a linear layer. The output of each linear layer is provided to a plurality of attention heads which perform scaled dot product attention. A General Matrix Multiplication (GEMM) operation is performed on the KT and Q values. The result of the GEMM operation is then scaled. In some examples, the result of the GEMM and scale is subjected to softmax application and optional mask. The result of the softmax is then multiplied by the V values. This is shown in the equation below.

$$Attn(Q, K, V) = Softmax\left(\frac{Mask(QK^T)}{\sqrt{d}}\right)V$$

The values from the attention heads are concatenated and then subjected to a linear layer.

Figure 4:
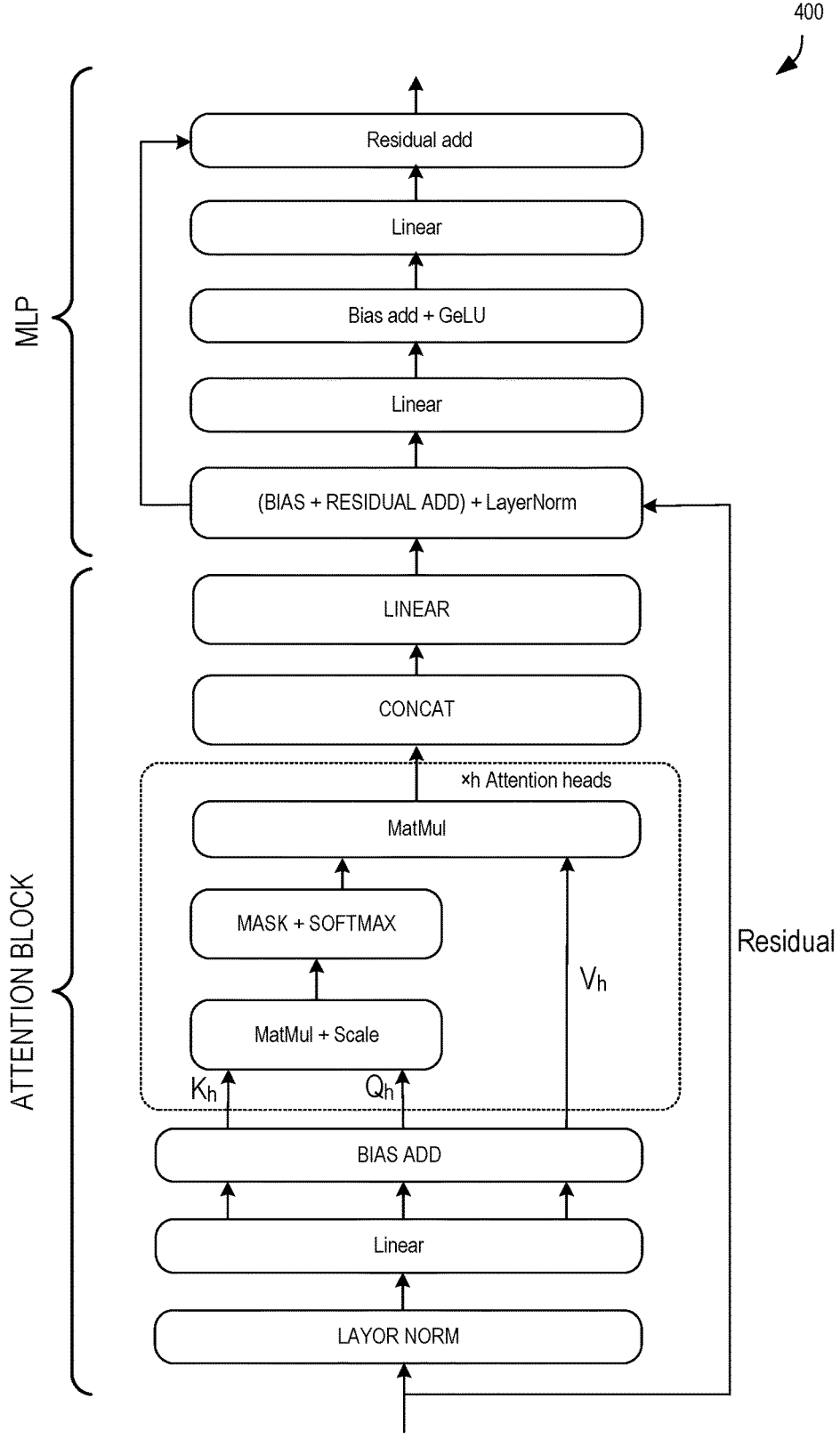
FIG. 4 illustrates examples of a Transformer-based architecture that includes an attention block whose output is provided to a multilayer perceptron.

FIG. 4 illustrates examples of a Transformer-based architecture 400 that includes an attention block whose output is provided to a multilayer perceptron. In some examples, each block is a kernel call. A QKV GEMM input normalization section performs layer normalization of the embedded input. The normalized output is subjected to a linear layer to generate separate Q, K, and V values and a bias is added (e.g., a Q-bias, a K-bias, and a V-bias). The biased Q, K, and V are subjected to a plurality of attention heads.

The attention context is concatenated and subjected to a linear layer to generate an attention output.

A bias is added to the attention output and a residual from the input into the QKV GEMM input normalization section. A layer normalization is then applied. A linear feed-forward layer is then applied, a bias added, and an activation function such as a Gaussian Error Linear Unit (GeLU) is applied. Another linear layer is applied which generates a result and a residual is added to that result.

In some examples, one or more of the GEMMs are performed using quantized values.

In some examples data dependencies make it impossible to process queries from multiple positions in parallel. The self-attention layer in a Transformer model suffers in this respect. Queries produced at each position attend to key-value pairs produced at all positions up to and including that position. When generating from the trained model, the output of the self-attention layer at a particular position affects the token that is generated at the next position, which in turn affects the input to that layer at the next position. This prevents parallel computation. However, incremental computing may be used during self-attention (either multi-head or multi-query).

Example code for incrementally computing this self-attention layer is shown below.

```
Def MultiheadSelfAttentionIncremental (x, prev_K, prev_V, P_q, P_k, P_v, P_o):
    """ MultiheadSelf—Attention (onestep).
    Args:
        x: a tensor with shape [b,d]
        prev_K: a tensor with shape [b,h,m,k]
        prev_V: a tensor with shape [b,h,m,v]
        P_q: a tensor with shape[h,d,k]
        P_k: a tensor with shape[h,d,k]
        P_v: a tensor with shape[h,d,v]
        P_o: a tensor with shape[h,d,v]
    Returns:
        y: a tensor with shape[b,d]
        new_K: tensor with shape[b,h,m+1,k]
        new_V: tensor with shape[b,h,m+1,v]
    """
    q=tf.einsum ("bd,hdk→bhk", x, P_q)
    new_K=tf.concat (
        [prev_K, tf.expand_dims (tf.einsum ("bd,hdk→bhk",
        M, P_k), axis=2)], axis=2) new_V=tf.concat ([pre-
        v_V,tf.expand_dims (tf.einsum ("bd,hdv→bhv", M,
        P_v), axis=2)], axis=2)
    logits=tf.einsum ("bhk,bhmk→bhm", q, new_K)
    // doing duplication because using batches of K
    // 1 input and want a lot of outputs=no dupe will work
    weights=tf.softmax (logits)
    o=tf.einsum ("bhm,bhmv→bhv",weights, new_V)
    y=tf.einsum ("bhv,hdv→bd", O, P_o)
    return y, new_K, new_V
```

In this example, q is a query vector, h is the number of attention layers (heads), d is the dimensionality (e.g., d=hk), k is the head dimension, m is the context length which corresponds to different key-vector or value-vector pairs (represented by matrices K and V), and b is the batch size.

In this code, some of the functions have a string such as bd,hdk→bhk which defines the operations. To the left of the "→" are the input arrays and to the right of the "→" is the desired result. For the batch matrix multiplication of q=tf.einsum ("bd,hdk→bhk", x, P_q) this indicates that there are two source matrices x and P_q. For each new_K, the prev_K has to be loaded.

Figure 5:
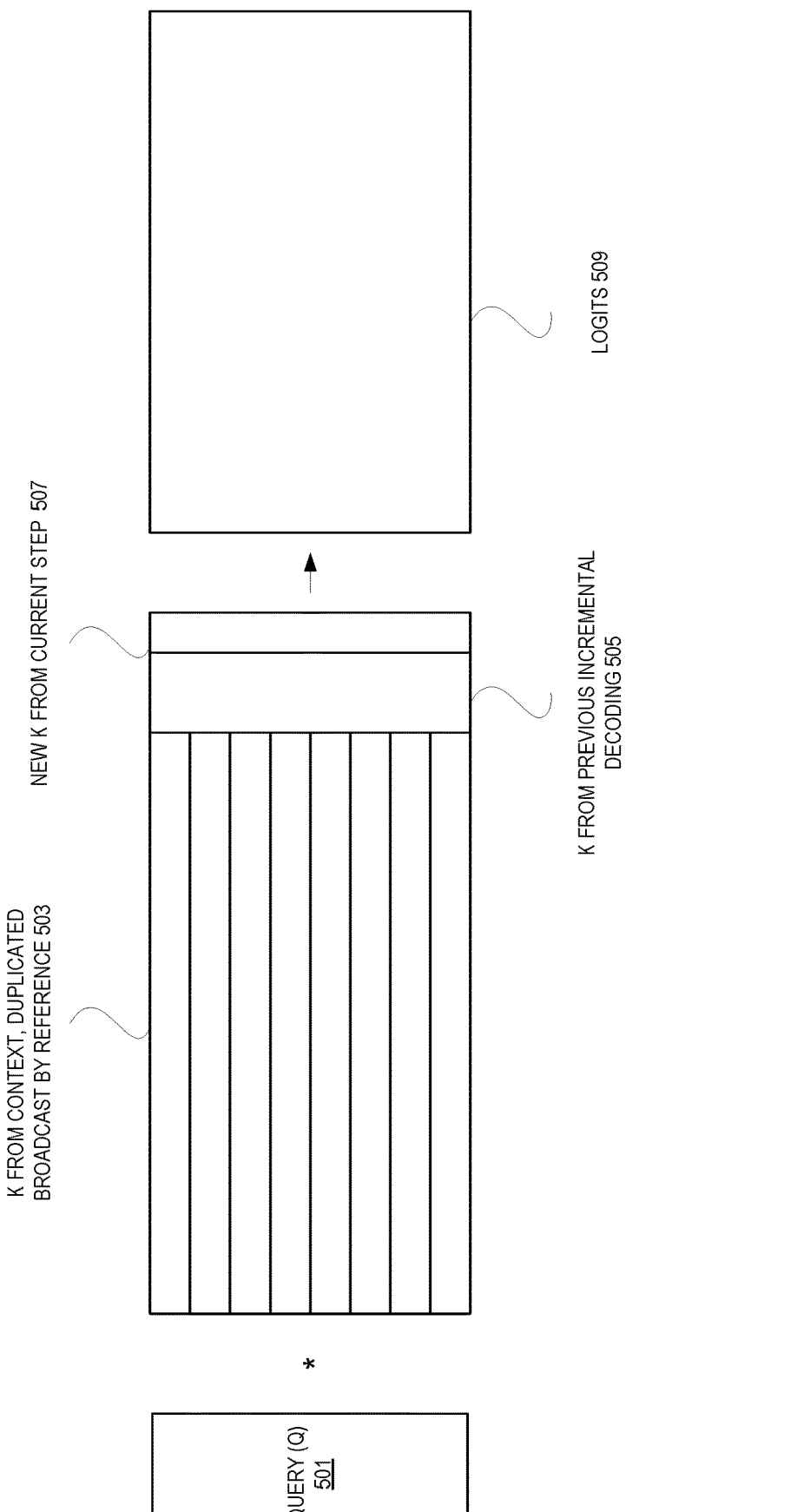
FIG. 5 illustrates examples of using incremental decoding.

FIG. 5 illustrates examples of using incremental decoding. In particular, logits are generated by performing a product of a query (Q) 501 and a duplicated key (K) from the context (which corresponds to the original text). In particular, logits=<q,K> or bhk, bhmk→bhm.

Note that tensor multiplication operator performs <q,K> by accessing difference batch indexes of K (bhmk) separately even though they correspond to the same attention values. That is, if the entire tensor is passed naively to the GEMM operator.

As shown, the K 503 is loaded multiple times to be multiplied by Q 501 to generate the new K 505 (e.g., new_K=tf.concat ([prev_K, tf.expand_dims (tf.einsum ("bd, hdk→bhk", M, P_k), axis=2)], axis=2) new_V=tf.concat ([prev_V,tf.expand_dims (tf.einsum ("bd,hdv→bhv", M, P_v), axis=2)], axis=2)). In this illustration, the logits 509 are calculated by doing a product of the query (Q) 501 by the new K 505 (e.g., logits=tf.einsum ("bhk,bhmk→bhm", q, new_K)).

Figure 6:
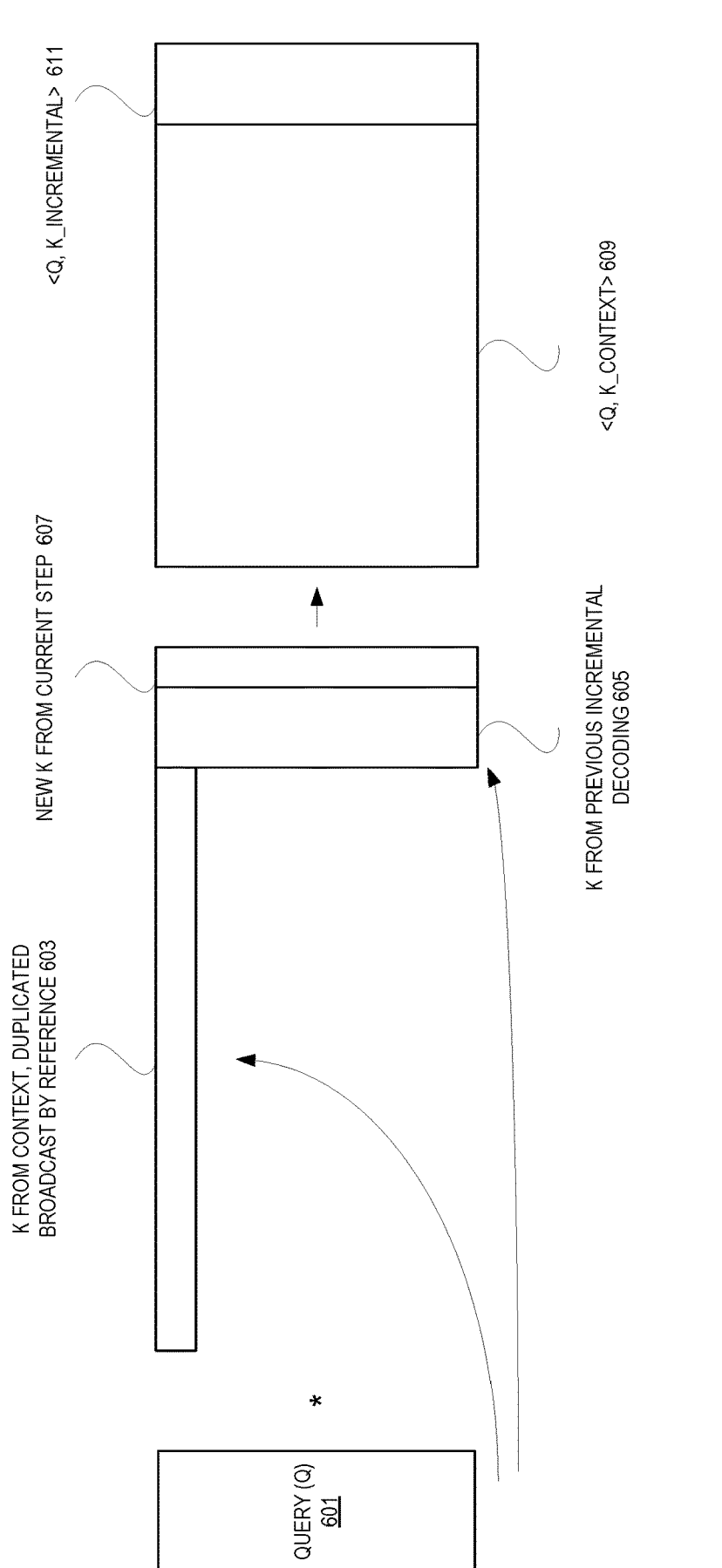
FIG. 6 illustrates examples of using incremental decoding without having to broadcast K.

FIG. 6 illustrates examples of using incremental decoding without having to broadcast K. In particular, logits=<q, K_context>609 concatenated with <q,K_incremental> 611 or bhk, hm*k→bhm* concatenated with bhk, bhm'k→bhm'. In this example, m* corresponds where m* corresponds to the context length of the original input computed in batch and m' corresponds to the context length due to incremental decoding.

In particular, logits are generated by performing a product (shown as <Q,K_context> 609) of a query 601 and a K 603 from the context (which corresponds to the original text) and concatenating that with a product (shown as <Q,K_incremental> 611) of the query 601 and the incremental portion (e.g., K from previous incremental decoding 605 and new K from the current step 607). Note that this approach may also be used for a <weight, V> calculation.

By not using broadcasting (or the reloading of K from the context) there is a reduced number of memory input/output (I/O) operations. In particular, the original I/O was bhk+ bhmk +bhm and the new memory I/O is bhk+hm*k+bhm'k+ bhm*+bhm'. While there is an additional cost of the concatenation, but that has less of a cost than I/O.

In some examples, multi-query attention (a variation of the multi-head attention described above) is used. Multi-head attention consists of multiple attention layers (heads) in parallel with different linear transformations on the queries, keys, values, and outputs. Multi-query attention is identical except that the different heads share a single set of keys and values. The code for (incremental) multi-query (self) attention is identical to the code listed above for multi-head attention, except that we remove the letter h from the einsum equations as it represents the "heads" dimension value. However, the same concept of not using a broadcast of K may be used.

FIG. 7 illustrates examples of code 700 for a <Q,K> calculation. As shown, if the K is not broadcast when using incremental decoding to generate attention weights the approach is to use concatenation (e.g., via a torch.cat function call, of the PyTorch framework, that concatenates a given sequence of tensors in a given dimension) of the attention weights context and attention weights incremental. If duplicate broadcasting is used, then the attention weights are generated by einsum or matmul (e.g., torch.einsum ("bhnk,bhmk→bhnm", query, local_window (key)) or attn_weights=torch.matmul (query, key.transpose (−1, −2))).

FIG. 8 illustrates examples of code 800 for a <weight, V> calculation. As shown, if the weight is not broadcast when using incremental decoding to generate an attention output the approach is to use concatenation (e.g., via a torch.cat function call) of the attention output context and attention output incremental. When the weight is broadcast, either a matmul or einsum is performed using the weights and value.

FIG. 9 is a flow diagram illustrating operations 900 of a method for using language model using at least GEMM and element-wise fusion according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the code generation recommendation service 110 or code generation recommendation component 140 of the other figures.

A request to use a trained language model is received at 902. In some examples, this request is a request to generate code based on a natural language statement (input text) of the request. In some examples, the request includes a code fragment to complete. In some examples, one or more characters are used to indicate the request. For example, a # may be used to indicate the text after the # is a request ("#sort a list of integers by the number of digits they have") or a comment indicator (e.g., //). In some examples, the request is received from an IDE. In some examples, the request is input into an IDE. In some examples, the request includes an indication of a number of potential code segment recommendations to generation (e.g., a batch or b value). The input may be one or more of video, image, audio, and/or text data.

In some examples, code will be generated based on the request at 904. The code being an output of the trained language model.

At 906 the input data from the request is provided as an input to the trained language model. In some examples, some pre-processing is performed first (e.g., cleaning up spelling, etc.).

The trained language model to the input data at 908. The application of the trained language model at least includes determining at least one of logits or an output of an attention-block uses incremental decoding, wherein the incremental decoding calculation is decomposed into at least an incremental calculation and a context calculation. In some examples, this includes not duplicating at least one of a context or weight during the attention calculation. In some examples, the incremental and context calculations are concatenated. In some examples, the incremental calculation includes a Q,K dot product calculation and/or a weights, V dot production calculation.

A result from the trained model is provided at 910. In some examples, the result is one or more recommended code segments.

Figure 10:
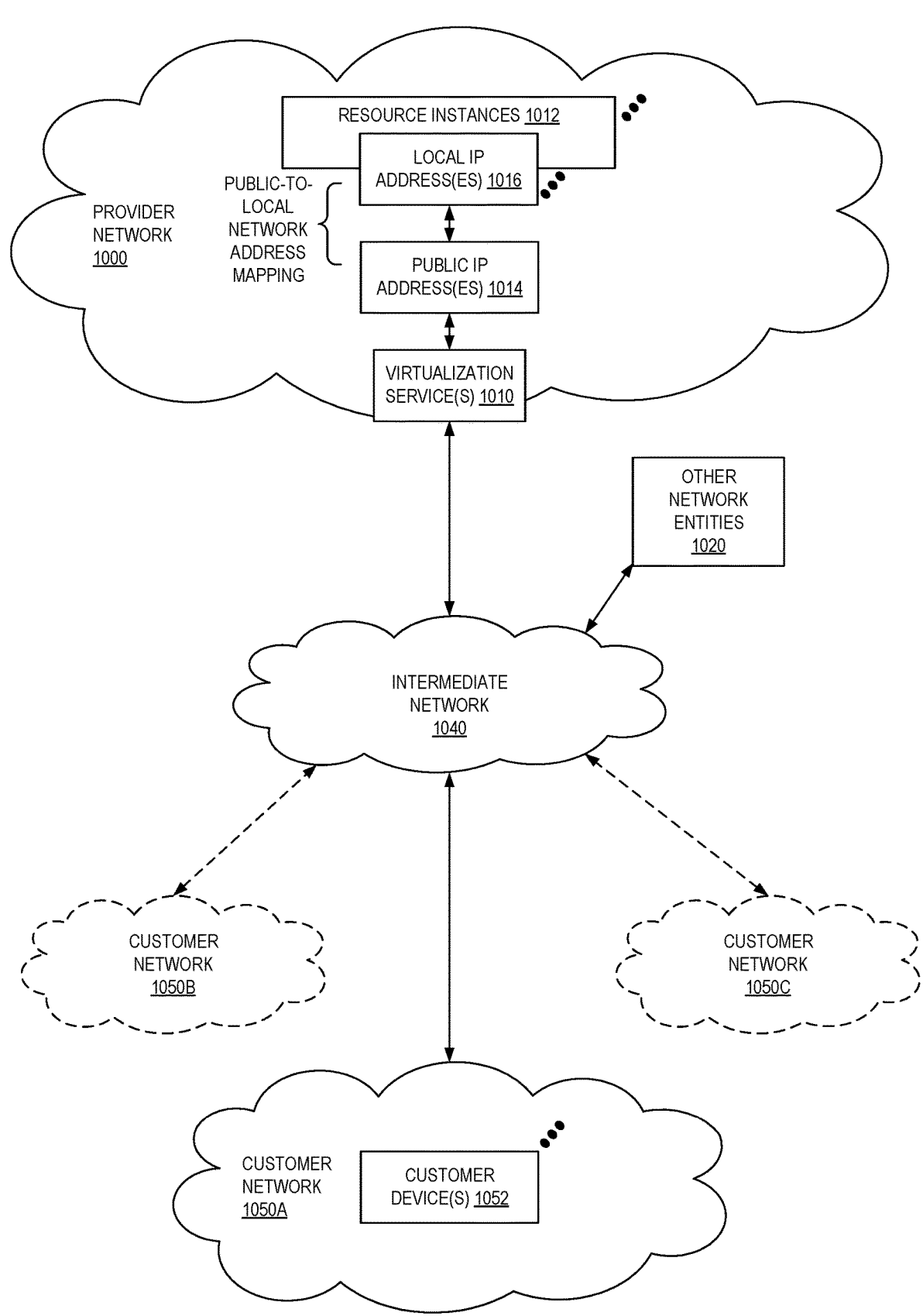
FIG. 10 illustrates an example provider network environment according to some examples.

FIG. 10 illustrates an example provider network (or "service provider system") environment according to some examples. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some examples, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

FIG. 11 is a block diagram of an example provider network environment that provides a storage service and a hardware virtualization service to customers, according to some examples. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some examples, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some examples, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some examples, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some examples, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
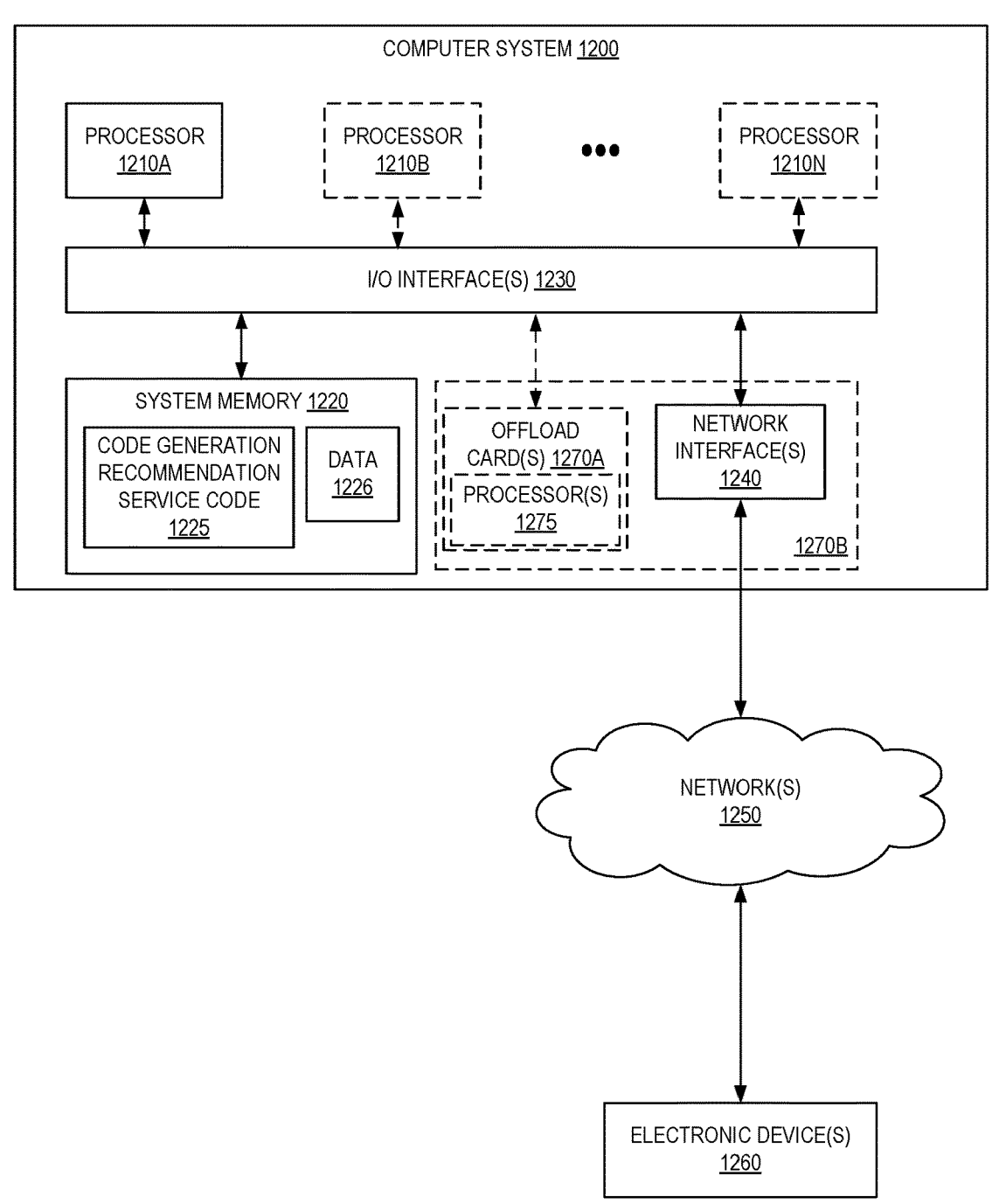
FIG. 12 is a block diagram illustrating an example computer system that can be used in some examples.

In some examples, a system that implements a portion or all of the techniques described herein can include a general-purpose computer system, such as the computer system 1200 (also referred to as a computing device or electronic device) illustrated in FIG. 12, that includes, or is configured to access, one or more computer-accessible media. In the illustrated example, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various examples the computer system 1200 can include one computing device or any number of computing devices configured to work together as a single computer system 1200.

In various examples, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various examples, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various examples, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1220 as code generation recommendation service code 1225 (e.g., executable to implement, in whole or in part, the code generation recommendation service 110) and data 1226.

In some examples, the I/O interface 1230 can be configured to coordinate I/O traffic between the processor 1210, the system memory 1220, and any peripheral devices in the device, including the network interface 1240 and/or other peripheral interfaces (not shown). In some examples, the I/O interface 1230 can perform any necessary protocol, timing, or other data transformations to convert data signals from one component (e.g., the system memory 1220) into a format suitable for use by another component (e.g., the processor 1210). In some examples, the I/O interface 1230 can include support for devices attached through various types of peripheral buses, such as a variant of the Peripheral Component Interconnect (PCI) bus standard or the Universal Serial Bus (USB) standard, for example. In some examples, the function of the I/O interface 1230 can be split into two or more separate components, such as a north bridge and a south bridge, for example. Also, in some examples, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various examples, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some examples the offload card(s) 1270A or 1270B can perform compute instance management operations, such as pausing and/or un-pausing compute instances, launching and/or terminating compute instances, performing memory transfer/copying operations, etc. These management operations can, in some examples, be performed by the offload card(s) 1270A or 1270B in coordination with a hypervisor (e.g., upon a request from a hypervisor) that is executed by the other processors 1210A-1210N of the computer system 1200. However, in some examples the virtualization manager implemented by the offload card(s) 1270A or 1270B can accommodate requests from other entities (e.g., from compute instances themselves), and cannot coordinate with (or service) any separate hypervisor.

In some examples, the system memory 1220 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving a request to generate code using a trained language model, the request including input data;
processing the input data using the trained language model, wherein the processing includes generating logits using attention computations for an incremental decoding, wherein the incremental decoding is decomposed into at least a context calculation and an incremental calculation, wherein the context calculation includes deriving a value from a query and a key from a context, wherein the incremental calculation includes deriving another value from the query and a key from a previous incremental decoding and a new key from a current step, and wherein the incremental decoding further includes concatenating the context calculation with the incremental calculation; and
outputting generated code from the trained language model.

2. The computer-implemented method of claim 1, wherein the incremental decoding includes not duplicating at least one of a context or a weight during the attention computations.

3. The computer-implemented method of claim 1, further comprising broadcasting to multiple indices within a sampling batch without duplicating a memory access for context attentions.

4. A computer-implemented method comprising:
receiving a request to generate code using a trained model, the request including input data;
processing the input data using the trained model, wherein the processing includes generating logits using attention computations for an incremental decoding, wherein the incremental decoding is decomposed into at least a context calculation and an incremental calculation, wherein the context calculation includes deriving a value from a query and a key from a context, wherein the incremental calculation includes deriving another value from the query and a key from a previous incremental decoding and a new key from a current step, and wherein the incremental decoding further includes concatenating the context calculation with the incremental calculation; and
outputting generated code from the trained model.

5. The computer-implemented method of claim 4, wherein the trained model utilizes multi-headed self-attention.

6. The computer-implemented method of claim 4, wherein the trained model utilizes multi-query self-attention.

7. The computer-implemented method of claim 4, wherein the trained model is Transformer-based.

8. The computer-implemented method of claim 7, wherein the Transformer-based model is a bidirectional encoder representations Transformer.

9. The computer-implemented method of claim 7, wherein the Transformer-based model is a generative pretrained Transformer.

10. The computer-implemented method of claim 7, wherein an attention mechanism of the Transformer-based model utilizes quantization.

11. The computer-implemented method of claim 4, further comprising performing the incremental decoding without broadcasting the key from the context.

12. The computer-implemented method of claim 11, further comprising concatenating attention weights for the context calculation and attention weights for the incremental calculation.

13. The computer-implemented method of claim 4, wherein the request includes a batch size indicating a number of outputs to present.

14. The computer-implemented method of claim 4, wherein the incremental decoding includes not duplicating at least one of a context or a weight during the attention computations.

15. A system comprising:
a first one or more electronic devices implementing a data storage service in a multi-tenant provider network; and
a second one or more electronic devices implementing a model hosting service in the multi-tenant provider network, the model hosting service hosting a trained model that includes instructions stored in non-transitory memory that upon execution by one or more processors cause the model hosting service to:
receive a request to generate code using the trained model, the request including input data stored in the data storage service;
process the input data using the trained model, wherein the processing includes generating logits using attention computations for an incremental decoding, wherein the incremental decoding is decomposed into at least a context calculation and an incremental calculation, wherein the context calculation includes deriving a value from a query and a key from a context, wherein the incremental calculation includes deriving another value from the query and a key from a previous incremental decoding and a new key from a current step, and wherein the incremental decoding further includes concatenating the context calculation with the incremental calculation; and
output generated code from the trained model.

16. The system of claim 15, wherein the instructions stored in the non-transitory memory comprise further instructions that, upon execution by the one or more processors, cause the model hosting service to broadcast to multiple indices within a sampling batch without duplicating a memory access for context attentions.

17. The system of claim 15, wherein the model hosting service is a part of a code generation service.

18. The system of claim 15, wherein the instructions stored in the non-transitory memory comprise further instructions that, upon execution by the one or more processors, cause the model hosting service to perform the incremental decoding without broadcasting the key from the context.

19. The system of claim 18, wherein the instructions stored in the non-transitory memory comprise further instructions that, upon execution by the one or more processors, cause the model hosting service to concatenate attention weights for the context calculation and attention weights for the incremental calculation.

20. The system of claim 18, wherein the incremental decoding includes not duplicating at least one of a context or a weight during the attention computations.

* * * * *